United States Patent
Weinstein et al.

(10) Patent No.: US 8,610,024 B1
(45) Date of Patent: Dec. 17, 2013

(54) APPARATUS AND METHOD FOR PRODUCING A LUNAR AGGLUTINATE SIMULANT

(75) Inventors: Michael Weinstein, Boulder, CO (US); Stephen A. Wilson, Westminster, CO (US)

(73) Assignees: Zybek Advanced Products, Inc., Boulder, CO (US); U.S. Geological Survey, Reston, VA (US)

( * ) Notice: Subject to any disclaimer, the term of this patent is extended or adjusted under 35 U.S.C. 154(b) by 1377 days.

(21) Appl. No.: 12/026,175

(22) Filed: Feb. 5, 2008

(51) Int. Cl.
*B23K 10/00* (2006.01)
*H01H 1/42* (2006.01)

(52) U.S. Cl.
USPC ............ 219/121.37; 219/121.43; 219/121.38; 219/121.36; 75/10.22; 423/659

(58) Field of Classification Search
CPC ...................................................... H05H 1/42
USPC ............ 219/121.36, 121.37, 121.59, 121.43; 219/121.38; 423/592.1; 373/18–22; 75/10.22, 10.5
See application file for complete search history.

(56) References Cited

U.S. PATENT DOCUMENTS

| | | | |
|---|---|---|---|
| 3,849,584 A | 11/1974 | Paton et al. | |
| 3,894,573 A | 7/1975 | Paton et al. | |
| 4,725,447 A | 2/1988 | Pfender | |
| 4,818,837 A | 4/1989 | Pfender | |
| 5,028,248 A | 7/1991 | Williams et al. | |
| 5,376,767 A * | 12/1994 | Heanley et al. | 219/121.36 |
| 5,403,991 A | 4/1995 | Tylko | |
| 5,539,176 A | 7/1996 | Ikegaya et al. | |
| 5,548,611 A | 8/1996 | Cusick et al. | |
| 5,586,140 A | 12/1996 | Ishida et al. | |
| 5,605,640 A | 2/1997 | Tylko et al. | |
| 5,626,249 A | 5/1997 | Tylko | |
| 5,734,673 A | 3/1998 | Kurahashi et al. | |
| 5,824,988 A | 10/1998 | Tylko | |
| 6,467,277 B2 * | 10/2002 | Okamura et al. | 62/6 |
| 7,547,431 B2 * | 6/2009 | Yadav et al. | 423/592.1 |
| 7,723,654 B2 * | 5/2010 | Taylor et al. | 219/679 |
| 7,811,670 B2 * | 10/2010 | Ragunathan et al. | 428/457 |
| 8,066,796 B1 * | 11/2011 | Gustafson et al. | 75/345 |

OTHER PUBLICATIONS

Batiste; Minnesota Lunar Regolith MLS-1; Jan. 24, 2005; Lunar Regolith Simulant Materials Workshop, Marshall Institute, Huntsville, Alabama.
Carpenter; Characterization Strategies and Requirements for Lunar Regolith Simulant Materials; Jan. 24, 2005, Lunar Regolith Simulant Materials Workshop, Marshall Institute, Huntsville, Alabama.
NASA; Final Lunar Regolith Simulant Materials Report; Dec. 9, 2005; NASA, Marshall Space Flight Center, Huntsville, Alabama.
Mangels; Coping with a lunar dust-up; Feb. 15, 2007; The Seattle Times.

* cited by examiner

*Primary Examiner* — Mark Paschall
(74) *Attorney, Agent, or Firm* — Pritzkau Patent Group, LLC (57) ABSTRACT

An exemplary embodiment providing one or more improvements includes a device and method for producing a lunar agglutinate simulant in which batch material is supported and moved through a plasma arc at a rate which partially reacts the batch material.

29 Claims, 5 Drawing Sheets

APPARATUS AND METHOD FOR PRODUCING A LUNAR AGGLUTINATE SIMULANT

BACKGROUND

The exploration of the moon presents many challenges including the lack of atmosphere and extreme temperatures. Another challenge with moon exploration involves problems created by the lunar regolith. A regolith is generally a layer of loose matter that covers a rocky underlayer. The lunar regolith, covers most of the surface of the moon and contains a large amount of lunar agglutinate. On the order of 50% of the lunar surface is agglutinate.

Lunar agglutinates are individual particles which are made up a random mixture of smaller particles of material that are fused together with vesicular flow-banded glass. Agglutinates characteristics include highly irregular shapes containing nanophase elemental iron) ($Fe^\circ$ as well as a heterogeneous mixture of glass, and various mineral phases. Agglutinates are not naturally formed on the Earth since natural formation requires subjecting a material to a large number of impacts of micrometeors in a vacuum. Agglutinate particles are similar to dust in size but have sharp glassy edges instead of having a soft texture. Because of the glassy characteristics and the particles sizes, agglutinates present challenges for equipment and materials used by man on the moon.

During moon landings, agglutinates invade seals in spacesuits causing them to bleed oxygen. The agglutinates also wear away at outer layers of spacesuits and scratch helmet and camera lenses. During moon operations, radiators and mechanical joints can be coated or impeded by agglutinate and cease to function properly. Other problems have also been reported resulting from lunar agglutinate, including problems that affect the safety of the astronauts.

Future lunar exploration requires the development of a lunar agglutinate simulant to create an environment with agglutinate on Earth in which researchers can test equipment and material for use on the moon. Such a testing environment will require a large amount of high quality agglutinate simulant having a high degree of characteristic accuracy. Tons of agglutinate simulant at a reasonable cost are needed for testing. Traditional methods for producing quality agglutinate simulant used by others only produce a few grams at a time. These methods are proprietary, however they likely involve some type of particulate acceleration and impact. Other traditional methods can produce larger quantities, but the simulant produced by these methods is of lower quality in that it less accurately represents the lunar agglutinate.

One traditional, high quantity and relatively low quality agglutinate simulant production method involves the use of an In-Flight Sustained Shockwave Plasma Reactor (ISSP). In this method, a plasma arc is created by a hollow central cathode that is radially surrounded by anodes. A mineral material is injected into the plasma through the central cathode and free falls through the plasma arc to a collector. Free fall of the mineral material through the plasma arc produces the agglutinate simulant in relatively high quantities however the resulting agglutinate simulant is not a satisfactory simulation of the chemical, mineralogical or textural features of the lunar agglutinate. Among other things, this traditional method does not allow for control the ratio of glass in the agglutinate and is only able to produce a few grams per hour.

The foregoing examples of the related art and limitations related therewith are intended to be illustrative and not exclusive. Other limitations of the related art will become apparent to those of skill in the art upon reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, a method for producing a lunar agglutinate simulant is disclosed. The lunar agglutinate simulant having particles of mineral that are fused together by vesicular flow-banded glass. A plasma arc is generated and a batch material is supported. The supported batch material is moved through the plasma arc to expose the batch material to the plasma arc at a treatment rate for which one portion of the batch material is reacted by the plasma arc and another portion of the batch material is un-reacted by the plasma arc. The reacted portion of the batch material contains the vesicular flow-banded glass and the un-reacted batch material contains at least some un-reacted particles that are fused into a fixed positional relationship by the vesicular flow-banded glass.

A device for producing a lunar agglutinate simulant is also disclosed. The lunar agglutinate simulant having particles of mineral fused together by vesicular flow-banded glass. The device includes a plasma arc generator for generating a plasma arc. The device also includes a material support for supporting a batch material. The material support moves the supported batch material through the plasma arc to expose the batch material to the plasma arc at a treatment rate for which one portion of the batch material is reacted by the plasma arc and another portion of the batch material is un-reacted by the plasma arc. The reacted portion of the batch material contains the vesicular flow-banded glass. The un-reacted batch material contains at least some un-reacted particles that are fused into a fixed positional relationship by the vesicular flow-banded glass.

In addition to the exemplary aspects and embodiments described above, further aspects and embodiments will become apparent by reference to the drawings and by study of the following descriptions.

DETAILED DESCRIPTION

Various modifications to the described embodiments will be readily apparent to those skilled in the art and the generic principles taught herein may be applied to other embodiments. Thus, the present disclosure is not intended to be limited to the embodiment shown but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology has been adopted for purposes of enhancing the reader's understanding, with respect to the various views provided in the figures, and is in no way intended as being limiting.

Figure 1:
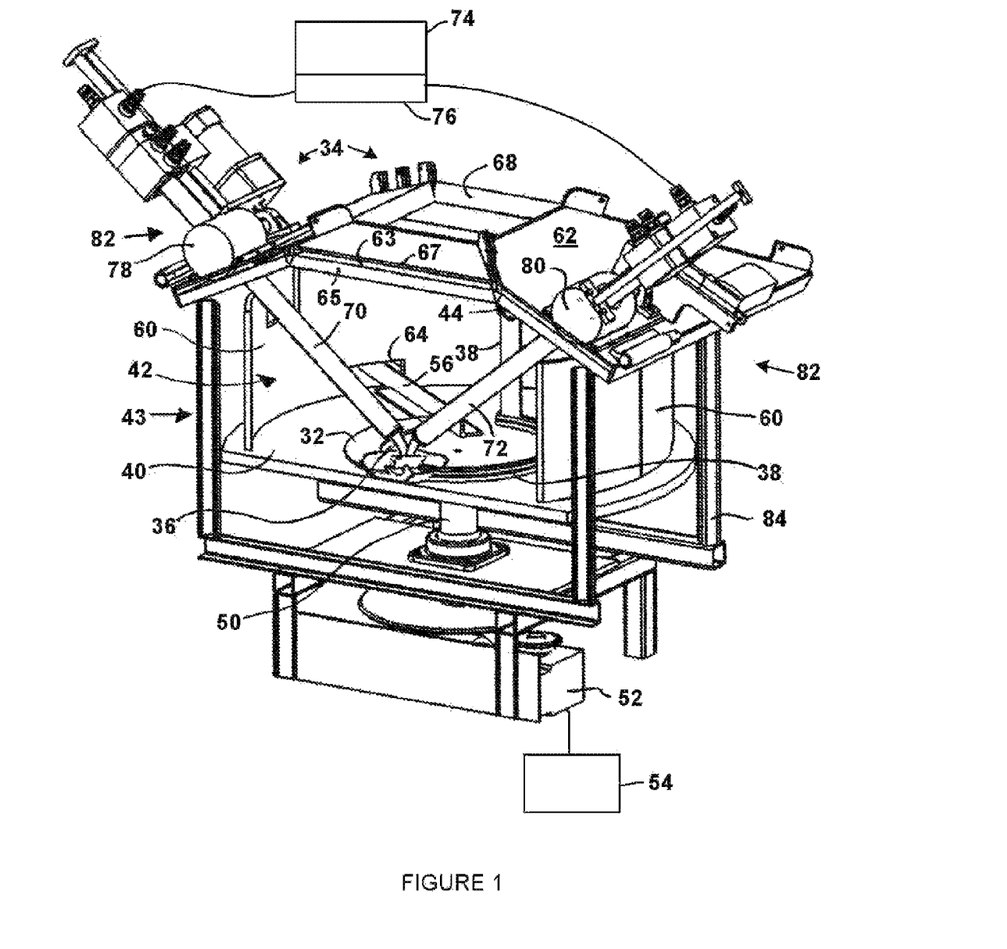
FIG. 1 is a partial cutaway perspective view of an agglutinate simulant production system.

Turning now to the figures wherein like reference numbers are used to refer to like components whenever possible throughout the various figures, attention is immediately directed to FIG. 1 which illustrates an apparatus 30 for producing a lunar agglutinate simulant 32 in a partial cutaway view. Apparatus 30 includes a plasma torch arrangement 34 for creating a plasma arc 36 that is applied to a batch material 38 while the batch material is supported by a material support 40 in a reaction chamber 42 defined by a reaction enclosure 43. The material support moves the batch material through the plasma arc to expose the material to the plasma arc for an amount of time referred to as a residence time. The residence time is determined by a treatment rate which is the rate at which the batch material is moved through the plasma arc by material support 40. Controlling the residence time, and temperature to which the batch material is subjected, produces a high quality lunar agglutinate simulant at a relatively high rate of production.

A reaction time for producing agglutinate simulant 32 is controlled by the relative position of the plasma arc, the residence time of the batch material in the plasma arc, the thickness of the batch material and the plasma power level. Different levels of reaction for the agglutinate simulant are obtained by adjusting these parameters.

In the present example, about 95% of the batch material is plagioclase, orthopyroxene and clinopyroxene. This material was selected because it has a close approximation to the mineral and chemical composition of lunar regolith in at least one location. A variety of other rock types can be substituted for use as a source material for producing agglutinate simulant with the appropriate composition since different compositions of material are found at different locations on the moon. The batch material was obtained from the Stillwater mining company and is representative of waste material produced during a mineral flotation process used to extract platinum group elements from platinum ore material. Nanophase elemental iron can also be added to the batch material to introduce nanophase elemental iron in the agglutinate simulant. Batch material 38 is in the form of sand.

The agglutinate production apparatus 30 partially reacts the batch material to produce simulant 32. When batch material 38 is subjected to the plasma arc, a portion of the mineralogical components are reacted by the heat of the plasma arc to fuse into vesicular flow banded glass. Another portion of the batch material is not reacted by the plasma arc. The residence time and heat transfer determine the completeness of the reaction melt and the size of the glass. The agglutinate simulant produced by the apparatus and method contains 5 to 50% flow banded glass by weight. The agglutinate production method and apparatus described herein has been empirically demonstrated. The agglutinate simulant produced by the method and apparatus described have been compared with actual lunar agglutinate by the United States Government and was found to be a suitable simulant. It is believed that no other high-volume simulants have agglutinate.

Figure 2:
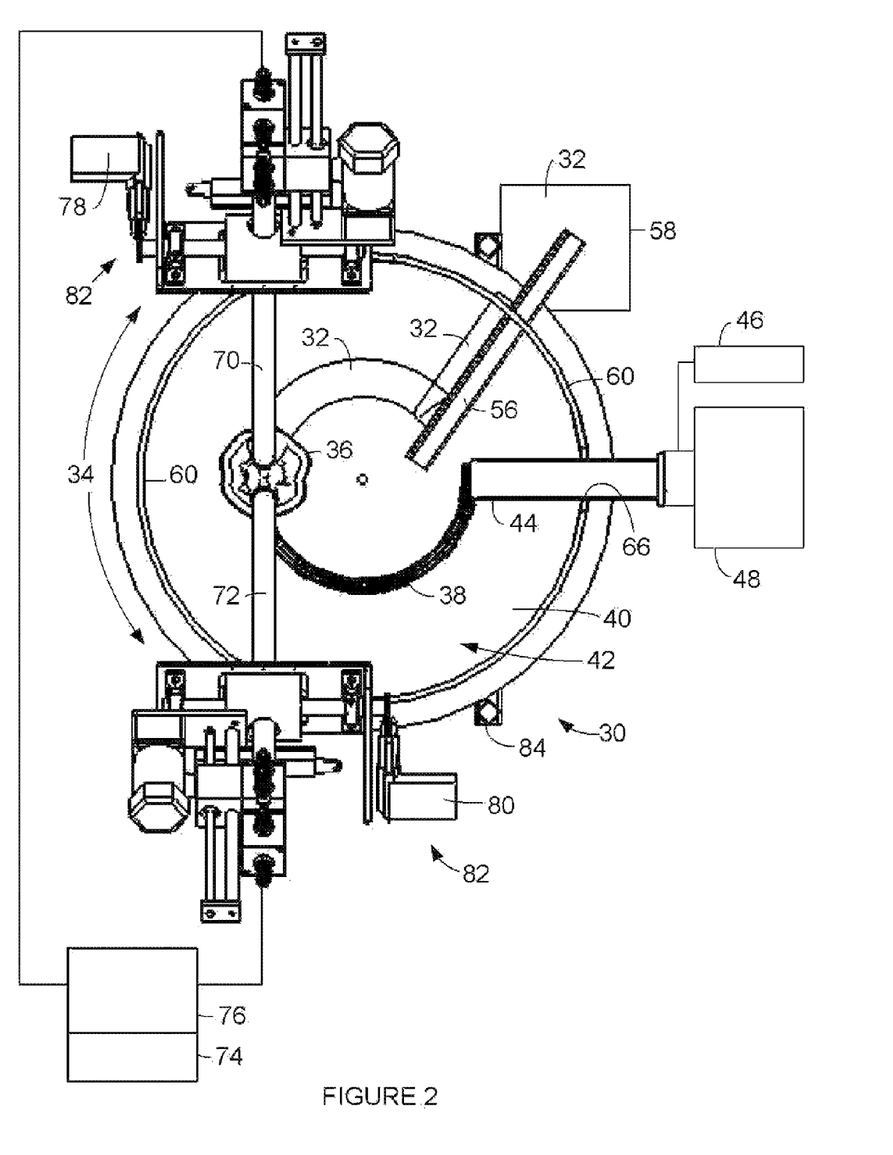
FIG. 2 is another view of the agglutinate simulant production system shown in FIG. 1 with certain components removed for clarity.

In the present example, batch material 38 is supplied to reaction chamber 42 with a feeder 44 that moves the batch material from a batch storage 48, as best shown in FIG. 2.

FIG. 2 is a plan view of the agglutinate production apparatus with certain portions of the reaction chamber 42 rendered as transparent to reveal the underlying features and components. Feeder 44 is an auger type feeder, however other types of feeders can also be used, including belt type feeders as long as the feeder is capable of moving the batch material from storage to the reaction chamber at a feed rate that is in a required range. Typically the feeder rate is between 1 and 500 pounds per hour. Feeder rate can be variable and can be controlled by a feeder rate controller 46. Feeder rate can also be set at a fixed rate. Feeder rate can also be controlled using a sensor in a closed loop arrangement.

Batch material 38 is deposited on material support 40 by feeder 44. In the present example, material support 40 is a circularly shaped piece of iron that is supported by a center support 50, shown in FIG. 1, and about which the material support rotates in a clockwise direction. Material support 40 is rotated using a rotation mechanism such as a support motor and gearbox 52. The rotation speed of the material support in the present example is variable and is controlled using a support speed controller 54. In other instances, the speed of rotation may be fixed. Controllers 46 and 54 (FIGS. 2 and 1 respectively) can be any conventional controller that is suitable for controlling motor speed, either manual or automatic. Rotation speed, or material support speed, can be controlled using a sensor in a closed loop operation. In one example, the sensor can be used in determining the amount of agglutinate, sand and glass in the simulant by color. This information can then be used by the controller to control operating parameters.

The batch material is deposited on the material support in a thickness that is at least partially determined by the rotation speed of material support 40 and the feeder rate of feeder 44. In the example shown in FIGS. 1 and 2, the material support has a radius of 90 cm and is rotated at 4 revolutions per minute, and the batch material is deposited on the material support at 60 cm from the center in a thickness of 2 cm and a width of 6 cm. It is noted that that the various values have been provided by way of example and are not intended as being limiting.

The speed of the feeder rate and the rotation of the material support are used to set the depth and width of the batch material that is exposed to the plasma arc at any one time. For any given feeder rate, slower rotation of the material support will cause larger amounts of batch material per area on the material support, while faster rotation of the material support will cause smaller amounts of batch material per area on the material support. Also, for any given rotation speed of the material support, higher feeder rates will cause larger amounts of batch material per area on the material support, while lower feeder rates will cause smaller amounts of batch material per area on the material support.

As material support 40 rotates in a clockwise direction, as viewed from above in FIG. 2, batch material 38 is moved through plasma arc 36 where a portion of the batch material is reacted by the heat of the plasma. In the example shown in FIGS. 1 and 2, plasma arc 36 contacts batch material 38 in a plasma contact area that is approximately 8 $cm^2$ and the plasma arc spans the entire cross section of the supported batch material. As material support 40 rotates, the plasma arc is applied to the material for 0.75 to 2.0 seconds. The plasma arc typically will have a total energy discharge of 100 kW to 250 kW. With these energy levels, the typical depth of the reaction into the batch is 1 to 5 cm. In the present example, the total power is set at 100 kW and the depth of penetration is usually about 5 mm. The depth of penetration can depend on the operating power level, gas flow and other parameters.

In addition to affecting the amount of batch material on the material support, the rotation speed also affects the portion of the batch material that is reacted and the depth that the plasma arc penetrates into the batch material while it is supported by material support 40. For any given depth and width of batch material and plasma arc power, slower rotation speeds cause the batch material to be exposed to the plasma arc for a longer period of time which increases the depth of penetration of the plasma arc. On the other hand, faster rotation speeds cause the batch material to be exposed to the plasma arc for a shorter period of time which decreases the depth of penetration of the plasma arc.

Following the exposure of the batch material to the plasma arc, the resulting agglutinate simulant material is removed from the high temperature plasma area and is allowed to cool. The material support moves the agglutinate simulant from the arc to a material remover such as a scraper 56 which forces the simulant to the outside edge of the material support by the movement of the support. When the simulant reaches the outside edge of the material support the simulant is deposited into a collector 58 for later use.

Reaction enclosure 43 contains the reaction to reduce the amount of radiant energy that escapes the reaction chamber and helps to contain the material in reaction chamber 42. Reaction enclosure 43 is generally defined by material support 40 on the bottom, side walls 60 on the sides and a hood 62 (FIG. 1) on the top. Side walls 60 and hood 62 are stationary in that they do not move with material support 40 when the material support is rotating. Various components of the simulant production device are connected or supported by a frame 84. Side walls 60 are constructed from steel and extend from the hood to slightly above material support 40 which allows the material support to rotate under the side walls around center support 50. Side walls 60 are arranged to form a perimeter around the reaction chamber to contain the reaction on the sides. Side walls 60 have an opening 64 for scraper 56 to remove the simulant from the reaction chamber. Side walls 60 also have an opening 66 for the feeder to supply the batch material to the reaction chamber. By having material support 40 supported at the center and not directly attached to side walls 60, the material support is able to freely expand and contract as heat is applied to and removed from the support.

Hood 62 includes an exhaust flue 68 (FIG. 1) for connection to ducting (not shown) to remove heat and exhaust gas from the reaction chamber. The rate of exhaust removal controls the overall temperature inside the reaction chamber. In the present example, hood 62 is liquid cooled with optional cooling passage 63 for reducing the amount of heat that is transferred to the surrounding environment. Any suitable cooling fluid can be used such as, for example, water. Hood 62 can include a thick metal panel 65 (approximately 2.5 cm thick) and a relatively thinner outer panel 67 with the cooling passage in between the panels. Thick metal panel 65 and outer panel 67 seal the cooling fluid in cooling passage 63. Although only one cooling passage is shown, other cooling passages are also included in the present example. The cooling passages are narrow and carry cooling water at a velocity sufficient to adequately cool the hood.

Plasma torch 34 is supported by hood 62 and includes an anode torch 70 and a cathode torch 72 that are controlled using a torch controller 74. In the present example in which a dual torch system is used, the torches are connected to a DC power supply 76 that is controlled via the torch controller. Inert gas is supplied through torches 70 and 72 to the plasma arc. Additional gas components can be used in the system as well and can be introduced through the plasma torches or can be inserted externally through a separate inlet port. A single torch can also be used to provide the plasma arc.

A torch positioning system 82 includes torch adjusters for the anode and cathode torches. Anode torch 70 includes a torch adjuster 78, and cathode torch 72 includes a torch adjuster 80. Torch adjusters 78 and 80 each have the capability to move their respective torches three dimensionally for positioning the torches to adjust the plasma arc location and the plasma arc characteristics created by the relative positioning of the anode and cathode torches. The torch positions dictate several operating parameters, for example, the volt/amp curve, the delivered power intensity, current flow and others. The torch adjusters are shielded against radiant heat from the plasma arc.

The application of the plasma arc to the batch material while the material is supported by the material support can result in the plasma arc stripping some of the material from the support and introducing the material into the agglutinate simulant. In one example, application of the plasma arc to a material support that is made of steel has been found to introduce nanophase elemental iron into the simulant. Nanophase elemental iron can also be introduced into the simulant by including nanophase iron in the batch material. The torches can be positioned to apply the plasma arc to a greater or less degree to the material support to adjust the amount of elemental iron or other material in the support that is introduced into the simulant.

Figure 3:
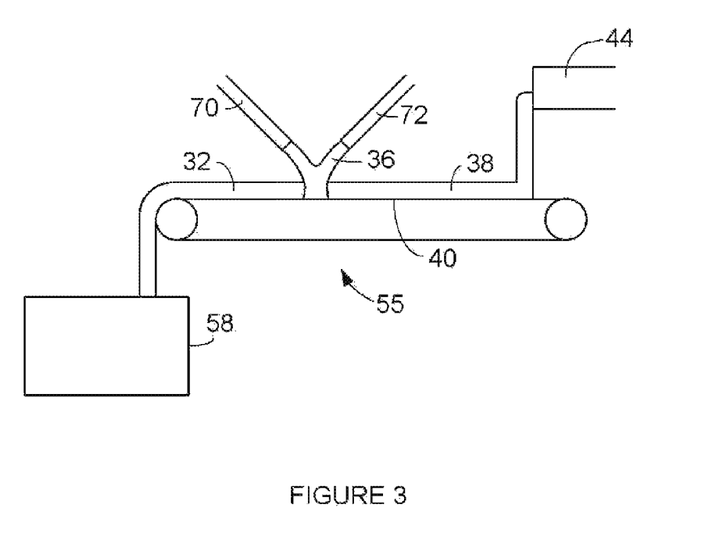
FIG. 3 is a diagrammatic view of an alternative portion of the agglutinate simulate production system.

Other mechanisms can also be used as a material support so long as the batch material is supported when it is subjected to the plasma arc. FIG. 3 is a diagrammatic view of a conveyor system 55 which may be used to support the batch material and move the batch material in a linear motion through the plasma arc at a speed and material depth at which the plasma arc is able to partially react the batch material.

Figure 4:
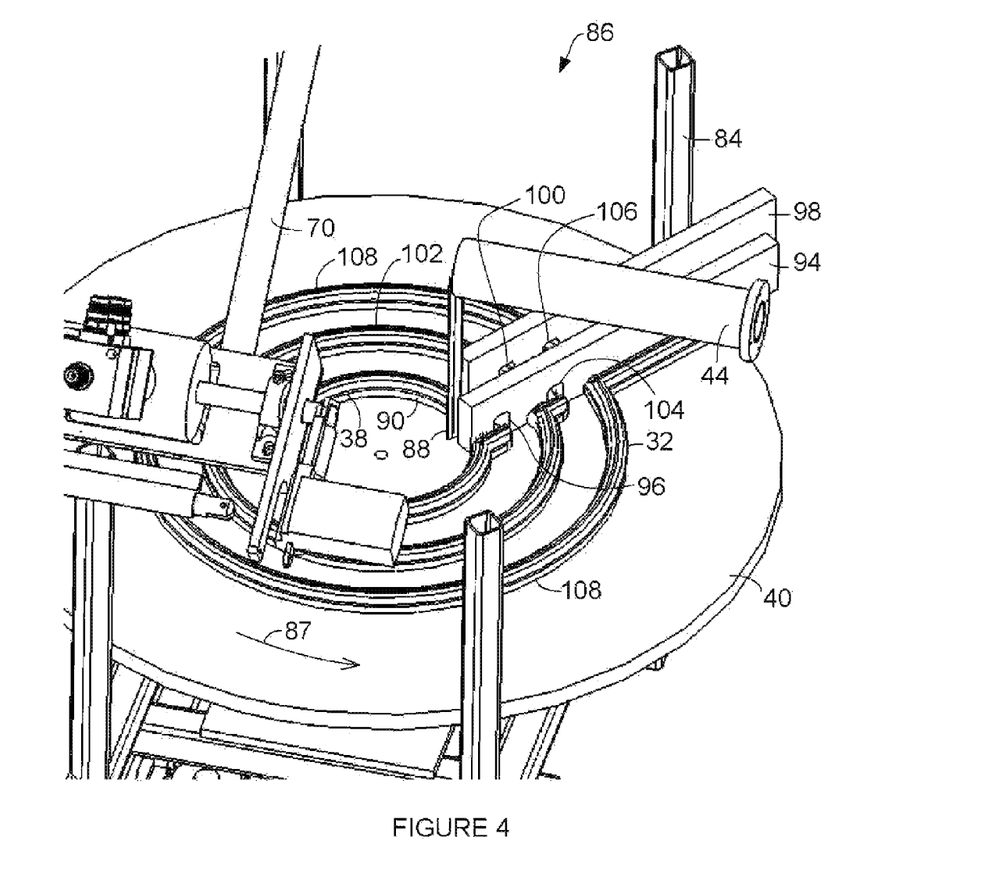
FIG. 4 is an enlarged perspective view of a portion of a multiple pass agglutinate simulant production system.
Figure 5:
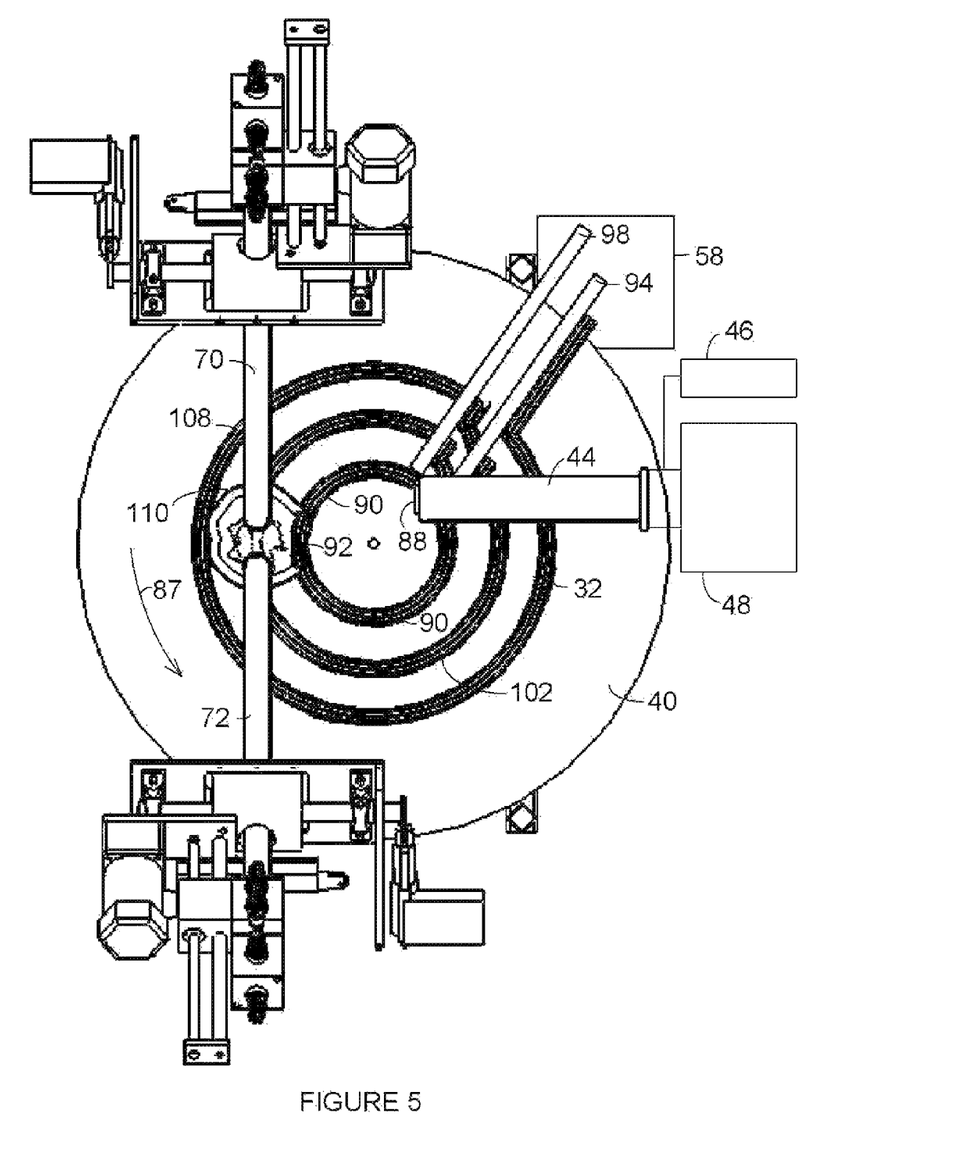
FIG. 5 is another view of the multiple pass agglutinate simulant production system shown in FIG. 4.

A multiple pass arrangement 86 for producing agglutinate simulant is shown in FIGS. 4 and 5. Components of the multiple pass arrangement 86 that are similar to single pass apparatus 30 are numbered the same in FIGS. 4 and 5 as they are in FIGS. 1 and 2. Various modifications to the described embodiments will be readily apparent to those skilled in the art and the generic principles taught herein may be applied to other embodiments. The present disclosure is not intended to be limited to the embodiment shown but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology has been adopted for purposes of enhancing the reader's understanding, with respect to the various views provided in the figures, and is in no way intended as being limiting.

In some instances, the batch material can be passed through the plasma zone additional times to further react the batch material to cause the outer layer of the simulant to become glassy, and/or to increase the reaction depth in the batch material. As shown in FIG. 5, the batch material remains on the material support for approximately three counterclockwise revolutions of the material support, as indicated by an arrow 87. The batch material is deposited on the material support at a first position 88. The material is carried on the material support in what can be generally considered an inner ring 90. While on the inner ring, the batch material passes next to plasma arc 36 at an area 92 (FIG. 5.).

By passing the batch material through area 92, the material is primarily exposed to the radiant energy emitted from the plasma arc. The radiant energy partially reacts the material and can change the heat absorption characteristics of the material. The depth of reaction varies with plasma energy, arc to material distance and the time that the material is exposed to the plasma arc. After passing next to the arc the first time, the material is mechanically transferred to another lane by a primary scraper 94. This operation is best illustrated in FIG. 4 where the material is moved away from the center of the material support by the primary scraper. The material is then allowed to pass through a first transfer passage 96 in the primary scraper. Shortly after passing through transfer passage 96, the material contacts a secondary scraper 98 and is moved further away from the center of material support 40, FIG. 4, before passing through a second transfer passage 100. After the material has passed through the second transfer passage, the material is in a middle ring 102. The material on the middle ring passes directly through the plasma arc. This pass exposes the material to a maximum temperature.

After the material has passed through the plasma arc on middle ring 102, the material contacts primary scraper 94 which moves the material further away from the center of the material support before allowing the material to pass through a third transfer passage 104. After the material has passed through the third transfer passage, the material contacts secondary scraper 98 which moves the material further away from the center before the material passes through a fourth transfer passage 106. The fourth transfer passage moves the material into an outer ring 108.

The material on the outer ring is primarily exposed to the radiant energy emitted from the plasma arc in an area 110. Following the exposure of the material at area 110, the material contacts the primary scraper which moves the material to the edge of the material support where the material is then deposited into collector 58. Multiple pass arrangement 86, as shown, facilitates three passes by and/or through the plasma arc. It should be understood that the multiple pass arrangement can include two or more passes past and/or through the plasma arc.

Material support 40 supports batch material 38 during the application of plasma arc 36 which allows for control over the reaction time by controlling the exposure or resident time that the arc is applied to the batch material. By supporting the batch material during the application of the plasma arc, the batch material can be subjected to a wide range of exposure times to give a wide range of reaction. Supporting the batch material during exposure to the plasma arc also allows for various thicknesses of batch material to be exposed. The depth of penetration of the plasma arc can be adjusted by adjusting the thickness of the batch material exposed to the plasma arc. The depth of penetration can be used to control the level of reaction in the batch material which affects the amount of glass in the agglutinate simulant.

The resident time of the batch material in the plasma arc is limited to times that only partially react the batch material in the process described herein. Material is rapidly removed from the reaction chamber and therefore not subject to long term exposure to the heat. Partially reacting the batch material limits the amount of the batch material that is converted into glass. Plasma torches have been used previously for processing glass. Much effort and care is taken with glass manufacturing to ensure the material has sufficient residence time to fully react. The chamber in these systems is designed to maximize the temperature exposure to the plasma and to maintain adequate energy to fully react the batch material. Typically, the glass reaction time is between 1 and 72 hours for complete reaction. In contrast, the agglutinate production system is designed to only partially react the material by maximizing the temperature and minimizing the exposure time. In addition, the agglutinate production system uses a novel method for the presentation and removal of batch material with respect to the plasma. Glass and mineral processing systems use a different melt container to create increased residence time.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for producing a lunar agglutinate simulant having particles of mineral fused together by vesicular flow-banded glass, comprising:
   generating a plasma arc;
   supplying a batch material;
   supporting the batch material; and
   moving the supported batch material through the plasma arc to expose the batch material to the plasma arc at a treatment rate for which one portion of the batch material is reacted by the plasma arc and another portion of the batch material is un-reacted by the plasma arc, the reacted portion of the batch material containing said vesicular flow-banded glass and the un-reacted batch material containing at least some un-reacted particles that are fused into a fixed positional relationship by the vesicular flow-banded glass.

2. A method as defined in claim 1 wherein the batch material is supported by a disk and the supported batch material is moved by rotating the disk.

3. A method as defined in claim 1 wherein the batch material is supported by a conveyor and the supported batch material is moved in a linear motion through the plasma arc.

4. A method as defined in claim 1 wherein the treatment rate is dependent on a depth of the batch material.

5. A method as defined in claim 1 wherein the treatment rate is between 1 and 500 pounds per hour.

6. A method as defined in claim 1 wherein the plasma arc reacts the batch material for a depth of between about 1 and 5 centimeters.

7. A method as defined in claim 1 wherein the plasma arc contacts the batch material in an area of between about 8 and 50 square centimeters.

8. A method as defined in claim 1 wherein the plasma arc has a total energy discharge of between about 100 kW and 250 kW.

9. A method as defined in claim 1 wherein the batch material is exposed to the plasma arc for a time period that is in a range of about 0.75 to 2 seconds.

10. A method as defined in claim 9, including cooling the batch material to an ambient environment temperature after the batch material is exposed to the plasma arc a single time.

11. A method as defined in claim 1 wherein the portion of the batch material that produces vesicular flow-banded glass is in a range about 5% to 50%.

12. A method as defined in claim 1 wherein at least a portion of the particles of the un-reacted batch material are nanophase elemental iron.

13. A method as defined in claim 12, further comprising supplying the nanophase elemental iron with the batch material.

14. A method as defined in claim 1, wherein said supporting includes using a platform to support the batch material and said platform includes iron and wherein said method further includes introducing nanophase elemental iron into the agglutinate simulant by applying the plasma arc to the platform.

15. A method as defined in claim 14 wherein the platform is used for supporting the batch material.

16. A method as defined in claim 1, further comprising introducing nanophase elemental iron into the agglutinate simulant by applying the plasma arc to particulates of iron in the batch material that are larger than nanophase to convert the particulates of iron into nanophase.

17. A method as defined in claim 1 wherein the batch material is in the form of a sand.

18. A method as defined in claim 1, further comprising containing the plasma arc in a heating environment at least partially defined by a barrier.

19. A method as defined in claim 18, further comprising cooling the barrier.

20. A method as defined in claim 19 wherein the barrier is cooled using a liquid.

21. A method as defined in claim 1 wherein said moving exposes the batch material to the plasma arc a plurality of times such that the material cools at least to a limited extend between a plurality of exposures.

22. A method as defined in claim 21 wherein the batch material is maintained in a heated environment between the exposures to the plasma arc.

23. A method as defined in claim 1 wherein the plasma arc is generated using plasma torches operating with inert gas.

24. A method as defined in claim 1 wherein the treatment rate is adjustable.

25. A method as defined in claim 24, further comprising adjusting the treatment rate to maintain a relationship between the reacted and the un-reacted material.

26. A method as defined in claim 1 wherein said batch material is supported by a disk at more than one radial position on the disk and the batch material is moved by rotating the disk, and moving the batch material includes moving the batch material at the radial positions on the disk to expose the batch material to the plasma arc a plurality of times.

27. A method as defined in claim 26 wherein said batch material is supported at a first distance relative to the plasma arc at one radial position on the disk and said batch material is positioned at a second, different distance relative to the plasma arc at another radial position on the disk.

28. A method as defined in claim 26 wherein the batch material is supported in at least one of the radial positions such that the batch material is exposed primarily to radiant energy from the plasma arc.

29. A method as defined in claim 1 wherein said batch material is supported by a disk and the batch material is moved by rotating the disk and wherein the treatment rate is adjustable by adjusting the rotational speed of the disk.

* * * * *